US008902854B2

(12) United States Patent
McCann et al.

(10) Patent No.: US 8,902,854 B2
(45) Date of Patent: Dec. 2, 2014

(54) METHODS, SYSTEMS, AND COMPUTER READABLE MEDIA FOR DIAMETER-BASED STEERING OF MOBILE DEVICE NETWORK ACCESS

(75) Inventors: Thomas Matthew McCann, Raleigh, NC (US); Petrus Wilhelmus Adrianus Jacobus Maria Nas, Gravenhage (NL); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 97 days.

(21) Appl. No.: 13/423,991

(22) Filed: Mar. 19, 2012

(65) Prior Publication Data

US 2012/0236824 A1    Sep. 20, 2012

Related U.S. Application Data

(60) Provisional application No. 61/454,456, filed on Mar. 18, 2011.

(51) Int. Cl.
| | | |
|---|---|---|
| *H04W 4/00* | (2009.01) | |
| *H04L 12/813* | (2013.01) | |
| *H04W 48/18* | (2009.01) | |
| *H04W 74/00* | (2009.01) | |
| *H04W 88/06* | (2009.01) | |
| *H04L 12/801* | (2013.01) | |

(52) U.S. Cl.
CPC .............. *H04W 48/18* (2013.01); *H04L 47/20* (2013.01); *H04W 74/00* (2013.01); *H04W 88/06* (2013.01); *H04L 47/14* (2013.01)
USPC .......................................................... 370/331

(58) Field of Classification Search
CPC ....... H04L 47/20; H04L 47/14; H04W 48/18; H04W 88/06; H04W 74/00
USPC .............. 370/310, 310.2, 328, 329, 331, 338, 370/341, 349; 455/406, 411, 432.1, 433, 455/435.1, 445
See application file for complete search history.

(56) References Cited

U.S. PATENT DOCUMENTS

| 8,089,942 B2 | 1/2012 | Cai et al. |
| 2003/0003928 A1 | 1/2003 | Marjelund et al. |

(Continued)

FOREIGN PATENT DOCUMENTS

| EP | 1 988 680 A1 | 11/2008 |
| EP | 2 093 931 A1 | 8/2009 |

(Continued)

OTHER PUBLICATIONS

Notification of Transmittal of the International Search Report and the Written Opinion of the International Searching Authority, or the Declaration for International Patent Application No. PCT/US2012/036784 (Nov. 1, 2012).

(Continued)

*Primary Examiner* — Ricky Ngo
*Assistant Examiner* — Kabir Jahangir
(74) *Attorney, Agent, or Firm* — Jenkins, Wilson, Taylor & Hunt, P.A.

(57) ABSTRACT

According to one aspect, the subject matter described herein includes a method for Diameter-based steering of mobile device network access. The method includes receiving a Diameter message associated with a mobile device. The method also includes determining, based on the Diameter message, whether the mobile device should be steered to access a radio access network or a radio access network type that is different from a radio access network or radio access network type currently supporting network access of the mobile device. The method further includes, in response to determining that the mobile device should access the different radio access network or radio access network type, steering the mobile device to access the different radio access network or radio access network type.

17 Claims, 13 Drawing Sheets

(56) References Cited

U.S. PATENT DOCUMENTS

| | | | |
|---|---|---|---|
| 2003/0092444 | A1 | 5/2003 | Sengodan et al. |
| 2004/0116117 | A1 | 6/2004 | Ahvonen et al. |
| 2005/0107091 | A1 | 5/2005 | Vannithamby et al. |
| 2007/0121501 | A1* | 5/2007 | Bryson ............... 370/230 |
| 2007/0195788 | A1 | 8/2007 | Vasamsetti et al. |
| 2008/0046963 | A1 | 2/2008 | Grayson et al. |
| 2008/0052258 | A1 | 2/2008 | Wang et al. |
| 2009/0109845 | A1 | 4/2009 | Andreasen et al. |
| 2010/0048161 | A1 | 2/2010 | He et al. |
| 2010/0290392 | A1 | 11/2010 | Rasanen et al. |
| 2010/0291923 | A1 | 11/2010 | Zhou et al. |
| 2010/0291924 | A1* | 11/2010 | Antrim et al. ............ 455/433 |
| 2010/0311392 | A1* | 12/2010 | Stenfelt et al. ............ 455/411 |
| 2011/0067085 | A1 | 3/2011 | Brouard et al. |
| 2011/0076985 | A1 | 3/2011 | Chami et al. |
| 2011/0096688 | A1* | 4/2011 | Sachs et al. ............ 370/252 |
| 2011/0158090 | A1 | 6/2011 | Riley et al. |
| 2011/0199903 | A1 | 8/2011 | Cuervo |
| 2011/0225306 | A1 | 9/2011 | Delsesto et al. |
| 2011/0230188 | A1* | 9/2011 | Gemski ............ 455/435.1 |
| 2011/0252123 | A1 | 10/2011 | Sridhar et al. |
| 2012/0014332 | A1 | 1/2012 | Smith et al. |
| 2012/0140632 | A1 | 6/2012 | Norp et al. |
| 2012/0144226 | A1* | 6/2012 | Yang et al. ............ 714/2 |
| 2014/0031029 | A1 | 1/2014 | Rajagopalan et al. |

FOREIGN PATENT DOCUMENTS

| | | |
|---|---|---|
| KR | 10-0497290 B1 | 6/2005 |
| WO | WO 2008/147933 A2 | 12/2008 |
| WO | WO 2009/058067 A1 | 5/2009 |
| WO | WO 2009/145785 A1 | 12/2009 |
| WO | WO 2009/149341 A2 | 12/2009 |
| WO | WO 2010/139360 A1 | 12/2010 |
| WO | WO 2011/082035 A2 | 7/2011 |
| WO | WO 2012/154674 A2 | 11/2012 |
| WO | WO 2014/015331 A1 | 1/2014 |

OTHER PUBLICATIONS

Communication of European Publication Number and Information on the Application of Article 67(3) EPC for European Patent Application No. 10841576.1 (Oct. 10, 2012).

Notification of Transmittal of The International Search Report and the Written Opinon of the International Searching Authority, or the Declaration for International Patent Application No. PCT/US2012/029663 (Aug. 29, 2012).

Notification of Transmittal of the International Search Report and the Written Opinon of the International Searching Authority, or the Declaration for International Patent Application No. PCT/US2010/061586 (Sep. 26, 2011).

3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).

Third Generation Partnership Project, "Technical Specification Group Core Network and Terminals; Universal Subscriber Identity Module (USIM), Application Toolkit (USAT)," 3GPP TS 31.111, V10.0.0 (Oct. 2010).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).

3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.1, pp. 1-35 (Jun. 2010).

Third Generation Partnership Project, "Access-Stratum (NAS) functions related to Mobile Station (MS) in idle mode," 3GPP TS 23.122, V10.0.0 (Jun. 2010).

3GPP, "Universal Mobile Telecommunications System (UMTS); LTE; 3GPP Evolved General Packet System (EPS); Evolved General Packet Radio Service (GPRS) Tunnelling Protocol for Control Plane (GTPV2-C); Stage 3 (3GPP TS 29.274 version 9.3.0 Release 9)," ETSI TS 129 274 V9.3.1, pp. 1-162 (Jun. 2010).

Rao, "Mobile Broadband Evolution—LTE and EPC," Motorola General Business, LTE EPC IEEE ComSoC Boston (Apr. 8, 2010).

"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).

Third Generation Partnership Project, "Access Network Discovery and Selection Function (ANDSF) Management Object (MO)," 3GPP TS 24.312, V9.1.0 (Mar. 2010).

Third Generation Partnership Project, "Service requirements for the Evolved Packet System (EPS)," 3GPP TS 22.278, V10.1.0 (Mar. 2010).

3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).

Third Generation Partnership Project, "Technical Specification Group Services and System Aspects; General Packet Radio Service (GPRS) enhancements for Evolved Universal Terrestrial Radio Access Network (E-UTRAN) acces (Release 8)," 3GPP TS 23.401, V8.4.1 (Dec. 2008).

Third Generation Pertnership Project, "Technical Specification Group Services and System Aspects; 3GPP System Architecture Evolution: Report on Technical Options and Conclusions," 3GPP TR 23.882, V8.0.0 (Sep. 2008).

Third Generation Pertnership Project 2, "cdma2000 High Rate Packet Data Air Interface; Specification," 3GPP2 C.S0024-A, Version 3.0 (Sep. 2006).

Calhoun et al., "Diameter Base Protocol," RFC 3588, pp. 1-147 (Sep. 2003).

Communication of extended European Search Report for European Patent Application No. 10841576.1 (May 9, 2014).

Notice of Allowance and Fee(s) Due for U.S. Appl. No. 12/973,228 (Mar. 20, 2014).

Non-Final Office Action for U.S. Appl. No. 13/465,601 (Mar. 7, 2014).

Communication of European Publication Number and Information on the Application of Article 67(3) EPC for European Patent Application No. 12781800.3 (Feb. 12, 2014).

Communication of European Publication Number and Information on the Application of Article 67(3) EPC for European Patent Application No. 12760558.2 (Jan. 7, 2014).

Notification of Transmittal of the International Search Report and the Written Opinion of the International Searching Authority, or the Declaration for International Application No. PCT/US2013/051447 (Oct. 28, 2013).

Non-Final Office Action for U.S. Appl. No. 12/973,228 (Oct. 25, 2013).

Final Office Action for U.S. Appl. No. 12/973,228 (Jun. 21, 2013).

"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).

Non-Final Office Action for U.S. Appl. No. 12/973,228 (Feb. 1, 2013).

* cited by examiner

Exemplary Steering Policy Rule Data

| Subscriber ID (e.g., IMSI, GUTI, URI) | Steering Condition 1 (e.g., visited PLMN ID) | Steering Condition 2 (e.g., RAT-type) | Steering Condition 3 (e.g., day of week) | Steering Condition 4 (e.g., time of day) | Steering Condition 5 (e.g., tracking area, location area, cell ID) | Allowed / Denied | PLMN Selector w/ Access Technology List Profile |
|---|---|---|---|---|---|---|---|
| * | VisitedNetX | * | * | * | * | Denied: Error Code_1 | n/a |
| SubID1 | * | RAT-typeY | * | * | * | Denied: Error Code_2 | List1 |

Exemplary Steering Log Data

| Subscriber ID (e.g., IMSI, GUTI, URI) | PLMN Selector w/ Access Technology List Profile Pushed | Profile Push Timestamp |
|---|---|---|
| SubID1 | List1 | 1/1/2010, 02:30:34 |

METHODS, SYSTEMS, AND COMPUTER READABLE MEDIA FOR DIAMETER-BASED STEERING OF MOBILE DEVICE NETWORK ACCESS

PRIORITY CLAIM

This application claims the benefit of U.S. Provisional Patent Application Ser. No. 61/454,456, filed Mar. 18, 2011; the disclosure of which is incorporated herein by reference in its entirety.

TECHNICAL FIELD

The subject matter described herein relates to Diameter-based steering of mobile device network access. More specifically, the subject matter relates to methods, systems, and computer readable media for Diameter-based steering of mobile device network access.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

As wireless communication technology continues to evolve, many providers are able to offer their subscribers services via a variety of radio access technologies supported by one or more radio access networks. While such an expanding infrastructure allows a provider to support greater services for its subscribers, often a provider may desire to manage how a particular subscriber or subset of subscribers utilizes its network resources at a given time or under a given set of network conditions.

Accordingly, a need exists for methods, systems, and computer readable media for Diameter-based steering of mobile device network access.

SUMMARY

According to one aspect, the subject matter described herein includes a method for Diameter-based steering of mobile device network access. The method includes receiving a Diameter message associated with a mobile device. The method also includes determining, based on the Diameter message, whether the mobile device should be steered to access a radio access network or a radio access network type that is different from a radio access network or radio access network type currently supporting network access of the mobile device. The method further includes, in response to determining that the mobile device should access the different radio access network or radio access network type, steering the mobile device to access the different radio access network or radio access network type.

According to another aspect, the subject matter described herein includes a system for Diameter based steering of mobile device network access. The system includes a network node. The network node includes a communication interface configured to receive a Diameter message associated with a mobile device. The network node also includes a steering module configured to determine, based on the Diameter message, whether the mobile device should be steered to access a radio access network or a radio access network type that is different from a radio access network or radio access network type currently supporting network access of the mobile device, and, in response to determining that the mobile device should access the different radio access network or radio access network type, steer the mobile device to access the different radio access network or radio access network type.

As used herein, the term "node" refers to a physical computing platform including one or more processors and memory.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 10 is an exemplary steering policy rule data table for Diameter-based steering of mobile device network access in accordance with embodiments of the subject matter described herein;

FIG. 11 is an exemplary steering log data table for Diameter-based steering of mobile device network access in accordance with embodiments of the subject matter described herein;

DETAILED DESCRIPTION

Figure 1:
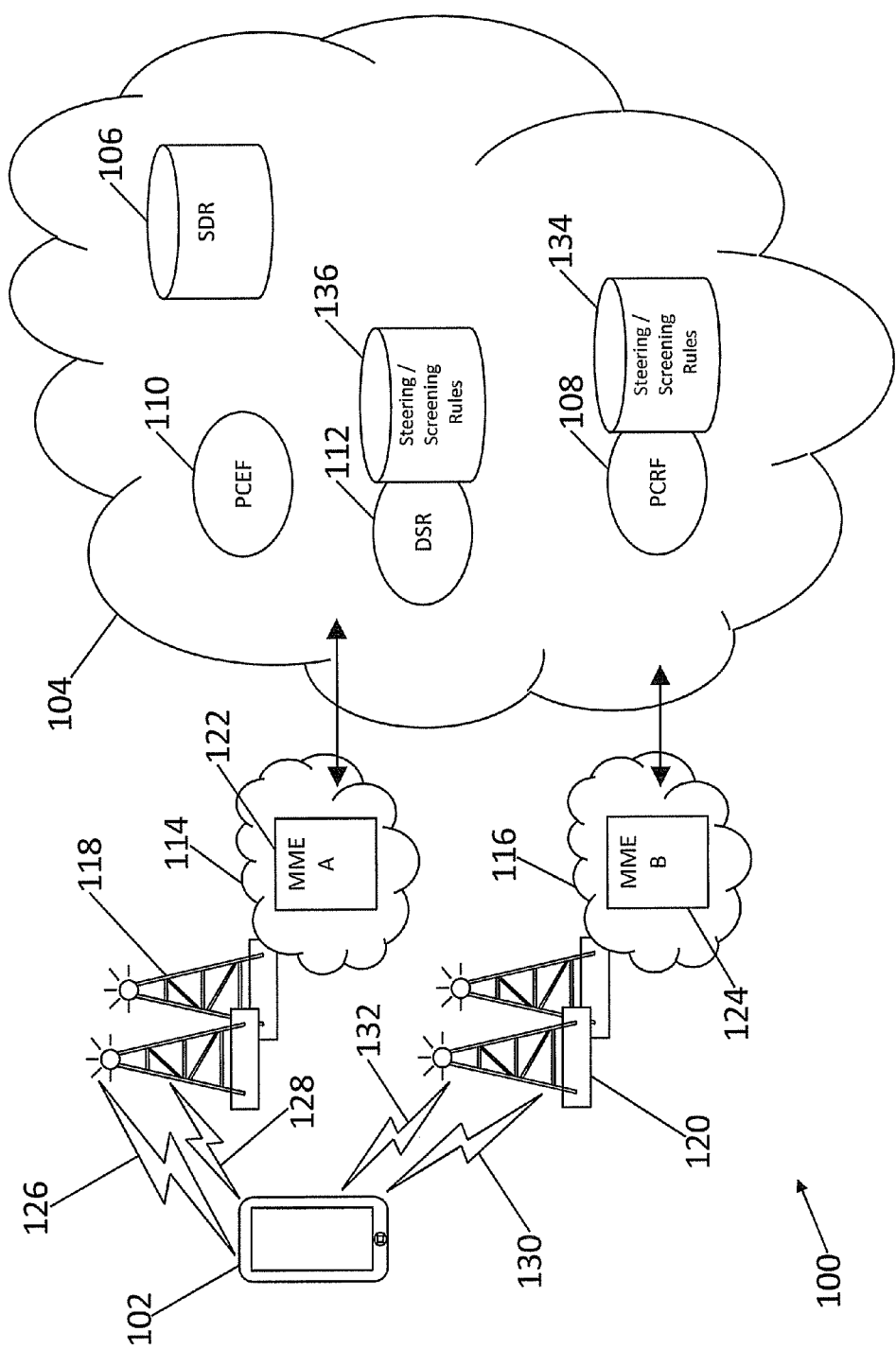
FIG. 1 is a network diagram illustrating an exemplary network environment for Diameter-based steering of mobile device network access in accordance with embodiments of the subject matter described herein.

Methods, systems, and computer readable media for Diameter-based steering of mobile device network access are provided. FIG. 1 is a network diagram illustrating an exemplary network environment for Diameter-based steering of mobile device network access in accordance with embodiments of the subject matter described herein. Referring to FIG. 1, network environment 100 may include one or more mobile devices. For example, network environment 100 may include mobile device 102. Mobile device 102 may be any mobile device suitable for communicating within network environment 100. For example, mobile device 102 may be a mobile telephone handset, a smartphone, a personal digital assistant (PDA), a tablet computer, a laptop computer, a cellular modem, a cellular network access card, or any other device suitable for communicating within network environment 100. Network environment 100 may also include carrier network 104. Carrier network 104 may support mobile device 102 and enable mobile device 102 to communicate within network environment 100 and to network nodes external to network environment 100 (not illustrated). For example, carrier network 104 may provide mobile device 102 with Internet access. Carrier network 104 may include one or more network nodes for supporting mobile devices within network environment 100 (e.g., mobile device 102). For example, carrier network 104 may include subscriber data repository (SDR) node 106. SDR node 106 may serve as a central repository for subscriber related information and may be, for example, a home subscriber server (HSS) and/or a subscriber profile repository (SPR).

Carrier network 104 may also include policy and charging rules function (PCRF) node 108. PCRF node 108 may serve as a central policy decision point for network environment 100 and may make real-time policy decisions based on aggregated information pertaining to network environment 100. Carrier network 104 may also include policy and charging enforcement function (PCEF) node 110. PCEF node 110 may serve as a policy enforcement point within network environment 100 and may receive and enforce policy decisions received from PCRF node 108. PCEF node 110 may be, for example, a gateway general packet radio service (GPRS) support node (GGSN) and/or a packet data network (PDN) gateway node. One or more network nodes within network environment 100 may communicate via one or more Diameter messages, and carrier network 104 may further include Diameter signaling router (DSR) node 112 for processing and/or routing such Diameter messages. In some embodiments, DSR node 112 may function as a Diameter routing agent, a Diameter proxy agent, and/or a Diameter translation agent for Diameter messages within network environment 100.

Network environment 100 may also include one or more access networks for supporting communications between one or more mobile devices (e.g., mobile device 102) and carrier network 104. For example, network environment 100 may include access networks 114 and 116. Access networks 114 and 116 may include one or more transceiver/receiver stations for wirelessly communicating with one or more mobile devices (e.g., mobile device 102). For example, access network 114 may include transceiver/receiver stations 118 and access network 116 may include transceiver/receiver stations 120. Access networks 114 and 116 may also include one or more network nodes for supporting communications with one or more mobile devices (e.g., mobile device 102). For example, access network 114 may include mobility management entity (MME) node 122 for supporting communications with one or more mobile devices associated with access network 114. Similarly, access network 116 may include MME node 124 for supporting communications with one or more mobile devices associated with access network 116. Access networks 114 and 116 may utilize various radio access network types (e.g., global system for mobile communications radio access network (GRAN), global system for mobile communications edge radio access network (GERAN), and/or universal terrestrial radio access network (UTRAN)) for communicating with mobile devices operating in network environment 100 (e.g., mobile device 102). For example access network 114 may utilize radio access network type 126 and/or radio access network type 128 for communicating with mobile device 102. Similarly, access network 116 may utilize radio access network type 130 and/or radio access network type 132 for communicating with mobile device 102.

As described above, a provider may desire to manage how a particular subscriber or subset of subscribers utilizes its network resources at a given time or under a given set of network conditions. For example, a provider associated with carrier network 104 may prefer mobile device 102 utilize access network 114 versus access network 116 at a given time or under a given set of network conditions. Similarly, a provider associated with carrier network 104 may prefer mobile device 102 utilize radio access network type 126 versus radio access network type 128 and/or that mobile device 102 utilize radio access network type 130 versus radio access network type 132 at a given time or under a given set of network conditions. In accordance with embodiments of the subject matter described herein, Diameter-based steering of a mobile device may be utilized to steer a mobile device (e.g., mobile device 102) to a different radio access network (e.g., access network 114 and/or access network 116) and/or a different radio access network type (e.g., radio access network types 126, 128, 130, and/or 132). Diameter-based steering may be performed by one or more nodes within network environment 100. For example, Diameter-based steering may be performed by PCRF node 108 and/or DSR node 112. In some embodiments, PCRF node 108 and/or DSR node 112 may perform Diameter-based steering according to one or more steering/screening rules stored in one or more of steering/screening rules database 134 and/or steering/screening rules database 136.

Figure 2:
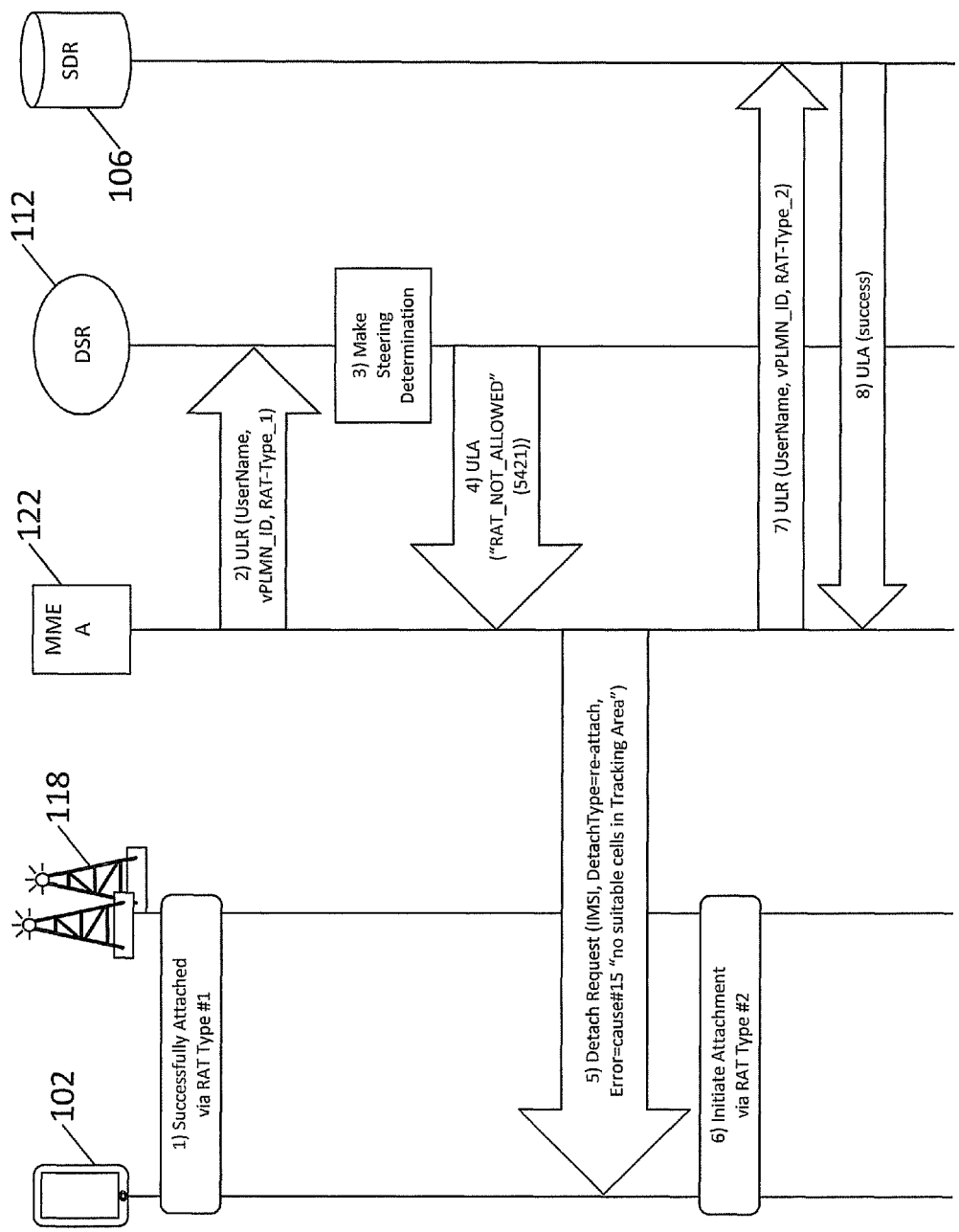
FIG. 2 is an exemplary message sequence for Diameter-based steering of mobile device network access to a different radio access network type in response to an update location request (ULR) in accordance with embodiments of the subject matter described herein.

FIG. 2 is an exemplary message sequence for Diameter-based steering of mobile device network access to a different radio access network type in response to an update location request (ULR) in accordance with embodiments of the subject matter described herein. Referring to FIG. 2, at step 1, mobile device 102 may be attached to one or more of access network 114's transceiver/receiver stations 118 via radio access network type 126. At step 2, access network 114's MME node 122 may send a ULR message to SDR node 106. The ULR message may specify that a subscriber utilizing mobile device 102 is connected to access network 114 via radio access network type 126. En route to SDR node 106, DSR node 112 may intercept the ULR message. In accordance with embodiments of the subject matter described herein, at step 3, DSR node 112 may determine that mobile device 102 should be steered to radio access network type 128. For example, a steering rule stored in steering/screening rules database 136 may specify that the subscriber utilizing mobile device 102 should be steered to radio access network type 128. In some embodiments, DSR node 112 may determine that mobile device 102 should be steered to radio access network type 128 by examining username information (e.g., information associated with the subscriber utilizing mobile device 102), visited network identification information (e.g., information associated with access network 114), and/or radio access network type identification information (e.g., information associated with radio access network type 126) contained in the ULR message and may identify radio access network type 128 based on the examined username information, visited network identification information, and/or radio access network type identification information. In some embodiments DSR node 112 may log the Diameter-based steering event in a steering log table (not illustrated).

At step 4, DSR node 112 may generate and communicate to MME node 122 an update location answer (ULA) message indicating that radio access network type 126 is not allowed for mobile device 102. MME node 122 may receive the ULA message and, at step 5, may generate and communicate to mobile device 102 a detach request message indicating that mobile device 102 should detach from access network 114. At step 6, mobile device 102 may reattach to one or more of access network 114's transceiver/receiver stations 118 via radio access network type 128. At step 7, access network 114's MME node 122 may send a ULR message to SDR node 106. The ULR message may specify that a subscriber utilizing mobile device 102 is connected to access network 114 via radio access network type 128. DSR node 112 may route the ULR message to SDR node 106 which, at step 8, may reply to access network 114's MME node 122 with a ULA message indicating that the location was successfully updated.

Figure 3:
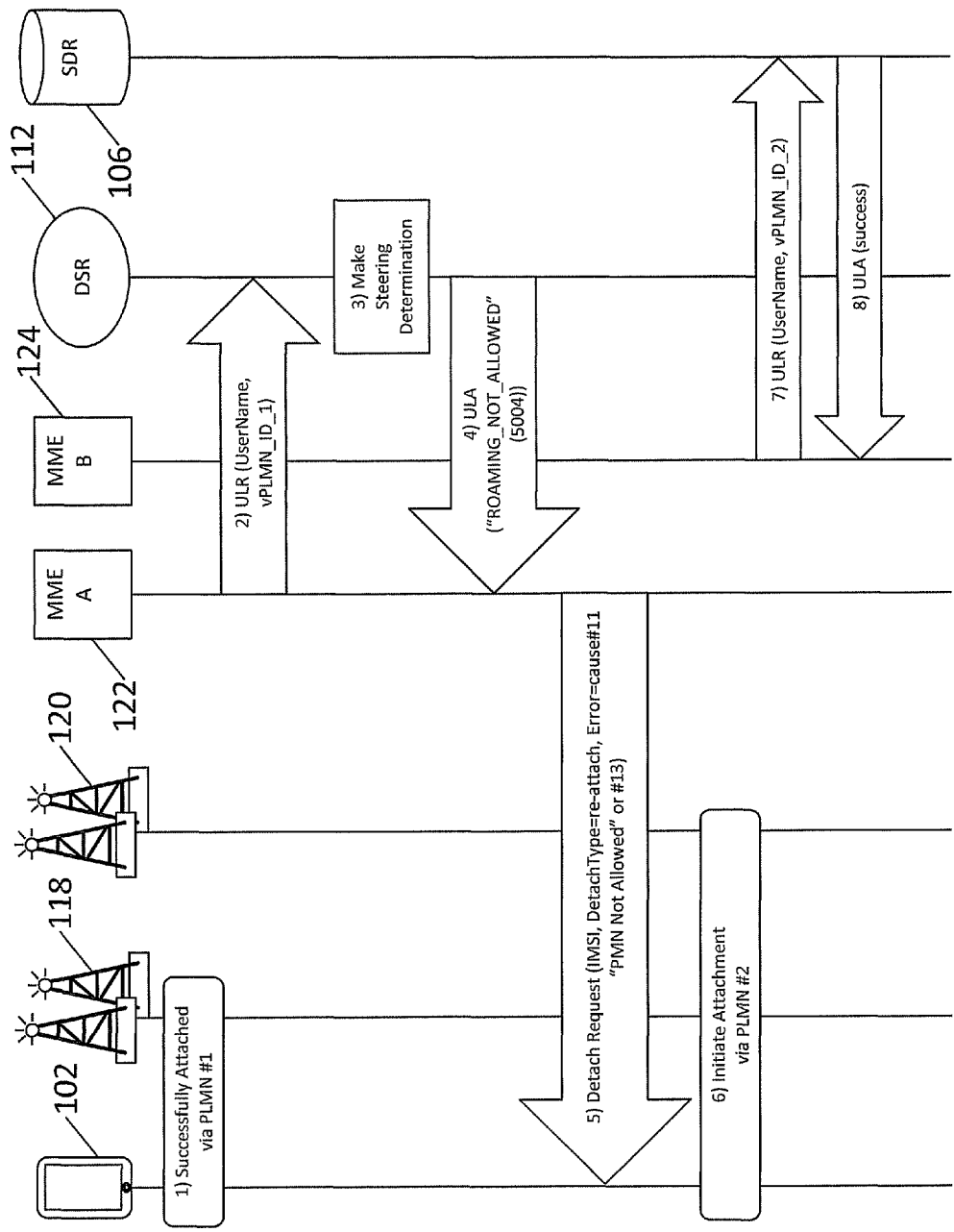
FIG. 3 is an exemplary message sequence for Diameter-based steering of mobile device network access to a different radio access network in response to a ULR in accordance with embodiments of the subject matter described herein.

FIG. 3 is an exemplary message sequence for Diameter-based steering of mobile device network access to a different radio access network in response to a ULR in accordance with embodiments of the subject matter described herein. Referring to FIG. 3, at step 1, mobile device 102 may be attached to one or more of access network 114's transceiver/receiver stations 118. At step 2, access network 114's MME node 122 may send a ULR message to SDR node 106. The ULR message may specify that a subscriber utilizing mobile device 102 is connected via access network 114. En route to SDR node 106, DSR node 112 may intercept the ULR message. In accordance with embodiments of the subject matter described herein, at step 3, DSR node 112 may determine that mobile device 102 should be steered to access network 116. For example, a steering rule stored in steering/screening rules database 136 may specify that the subscriber utilizing mobile device 102 should be steered to access network 116. In some embodiments, DSR node 112 may determine that mobile device 102 should be steered to access network 116 by examining username information (e.g., information associated with the subscriber utilizing mobile device 102), visited network identification information (e.g., information associated with access network 114), and/or radio access network type identification information (e.g., information associated with radio access network type 126 and/or radio access network type 128) contained in the ULR message and may identify access network 116 based on the examined username information, visited network identification information, and/or radio access network type identification information. In some embodiments DSR node 112 may log the Diameter-based steering event in a steering log table (not illustrated).

At step 4, DSR node 112 may generate and communicate to MME node 122 an update location answer (ULA) message indicating that access network 114 is not allowed for mobile device 102. MME node 122 may receive the ULA message and, at step 5, may generate and communicate to mobile device 102 a detach request message indicating that mobile device 102 should detach from access network 114. At step 6, mobile device 102 may attach to one or more of access network 116's transceiver/receiver stations 120. At step 7, access network 116's MME node 124 may send a ULR message to SDR node 106. The ULR message may specify that a subscriber utilizing mobile device 102 is connected to access network 116. DSR node 112 may route the ULR message to SDR node 106 which, at step 8, may reply to access network 116's MME node 124 with a ULA message indicating that the location was successfully updated.

Figure 4:
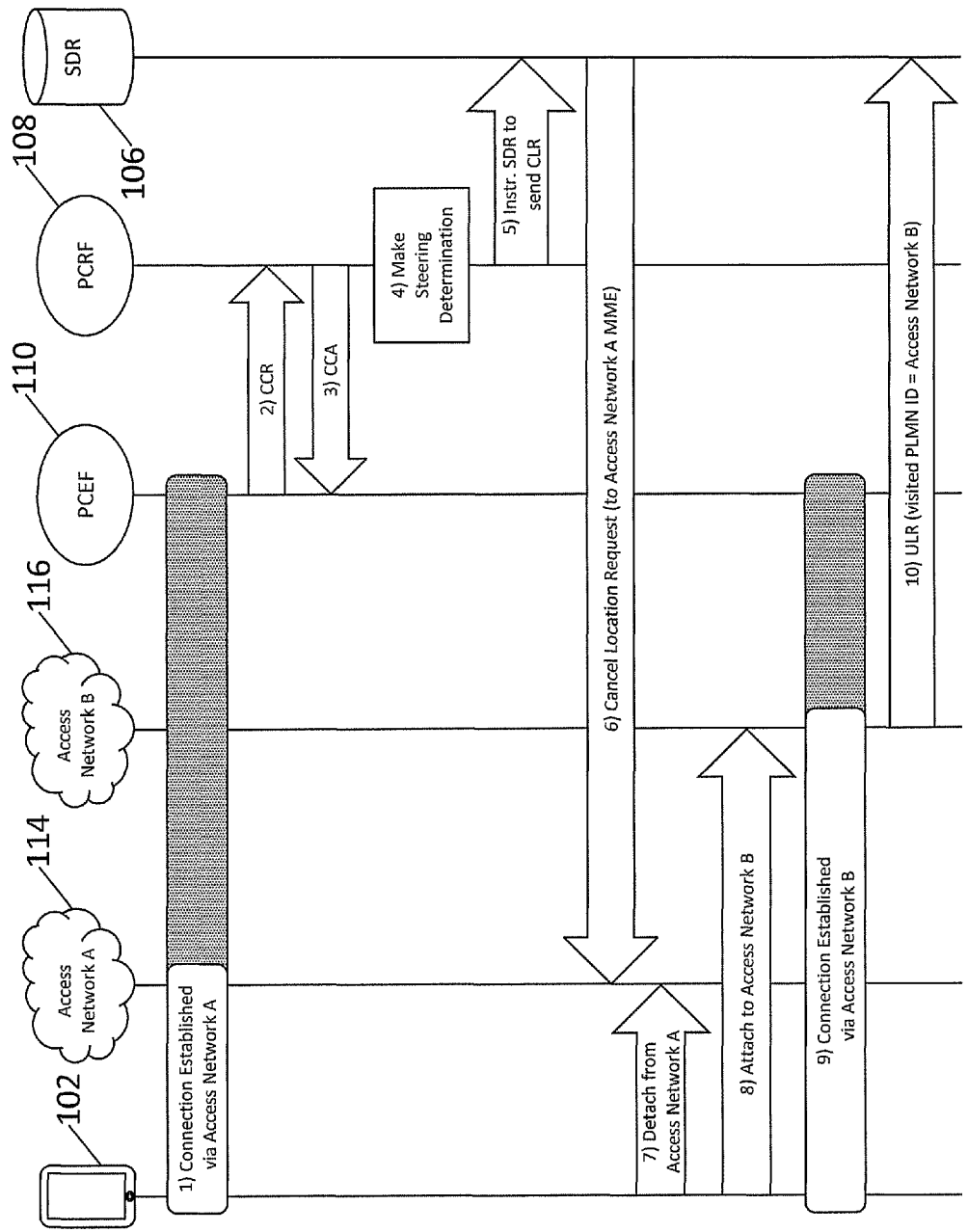
FIG. 4 is an exemplary message sequence for Diameter-based steering of mobile device network access in response to a credit control request (CCR) in accordance with embodiments of the subject matter described herein.

FIG. 4 is an exemplary message sequence for Diameter-based steering of mobile device network access in response to a credit control request (CCR) in accordance with embodiments of the subject matter described herein. Referring to FIG. 4, at step 1, mobile device 102 may be connected to PCEF node 110 via access network 114. At step 2, PCEF node 110 may send a CCR message associated with mobile device 102 to PCRF node 108. At step 3, PCRF node 108 may respond to the CCR message with a credit control answer (CCA) message. In accordance with embodiments of the subject matter described herein, at step 4, PCRF node 108 may determine that mobile device 102 should be steered to access network 116. For example, a steering rule stored in steering/screening rules database 134 may specify that the subscriber utilizing mobile device 102 should be steered to access network 116. In some embodiments, PCRF node 108 may determine that mobile device 102 should be steered to access network 116 by examining username information (e.g., information associated with the subscriber utilizing mobile device 102), visited network identification information (e.g., information associated with access network 114), and/or radio access network type identification information (e.g., information associated with radio access network type 126 and/or radio access network type 128) contained in the CCR message and may identify access network 116 based on the examined username information, visited network identification information, and/or radio access network type identification information. In some embodiments PCRF node 108 may log the Diameter-based steering event in a steering log table (not illustrated).

At step 5, PCRF node 108 may send a message to SDR node 106 instructing SDR node 106 to send a cancel location request (CLR) message to access network 114's MME node 122. At step 6, SDR node 106 may send a CLR message to access network 114's MME node 122. At step 7, mobile device 102 may detach from access network 114. At step 8, mobile device 102 may send a message to access network 116 to initiate attachment and, at step 9, mobile device 102 may establish a connection with PCEF node 110 via access network 116. At step 10, access network 116 may send a ULR message to SDR node 106 indicating mobile device 102's successful connection via access network 116.

Figure 5:
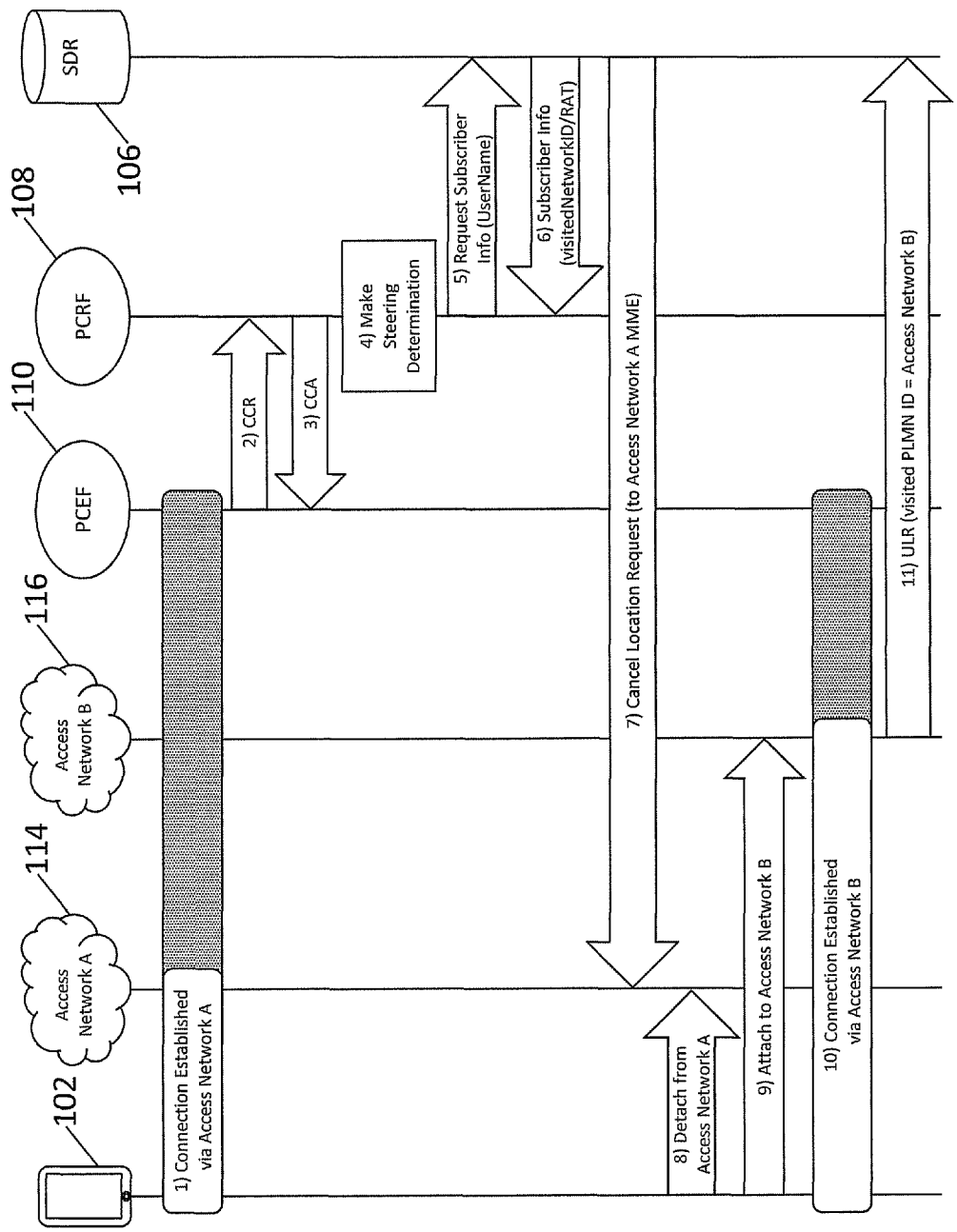
FIG. 5 is an exemplary message sequence for Diameter-based steering of mobile device network access in which subscriber information is obtained from a subscriber data repository in accordance with embodiments of the subject matter described herein.

FIG. 5 is an exemplary message sequence for Diameter-based steering of mobile device network access in which subscriber information is obtained from a subscriber data repository in accordance with embodiments of the subject matter described herein. Referring to FIG. 5, at step 1, mobile device 102 may be connected to PCEF node 110 via access network 114. At step 2, PCEF node 110 may send a CCR message associated with mobile device 102 to PCRF node 108. At step 3, PCRF node 108 may respond to the CCR message with a CCA message. In accordance with embodiments of the subject matter described herein, at step 4, PCRF node 108 may determine that mobile device 102 should be steered to access network 116. For example, a steering rule stored in steering/screening rules database 134 may specify that subscribers utilizing access network 114, radio access network type 126, and/or radio access network type 128 should be steered to access network 116. In some embodiments, PCRF node 108 may determine that mobile device 102 should be steered to access network 116 by examining username information (e.g., information associated with the subscriber utilizing mobile device 102) contained in the CCR message and utilizing the username information to obtain visited network identification information (e.g., information associated with access network 114) and/or radio access network type identification information (e.g., information associated with radio access network type 126 and/or radio access network type 128). For example, at step 5, PCRF node 108 may utilize username information contained in the CCR message (e.g., information associated with the subscriber utilizing mobile device 102) to query SDR node 106 for visited network identification information (e.g., information associated with access network 114) and/or radio access network type identification information (e.g., information associated with radio access network type 126 and/or radio access network type 128). At step 6, SDR node 106 may respond to PCRF node 108's query with a response indicating that the subscriber utilizing mobile device 102 is connected via access network 114, radio access network type 126, and/or radio access network type 128. In some embodiments PCRF node 108 may log the Diameter-based steering event in a steering log table (not illustrated).

At step 7, SDR node 106 may send a CLR message to access network 114's MME node 122. At step 8, mobile device 102 may detach from access network 114. At step 9, mobile device 102 may send a message to access network 116 to initiate attachment and, at step 10, mobile device 102 may establish a connection with PCEF node 110 via access network 116. At step 11, access network 116 may send a ULR message to SDR node 106 indicating mobile device 102's successful connection via access network 116.

Figure 6:
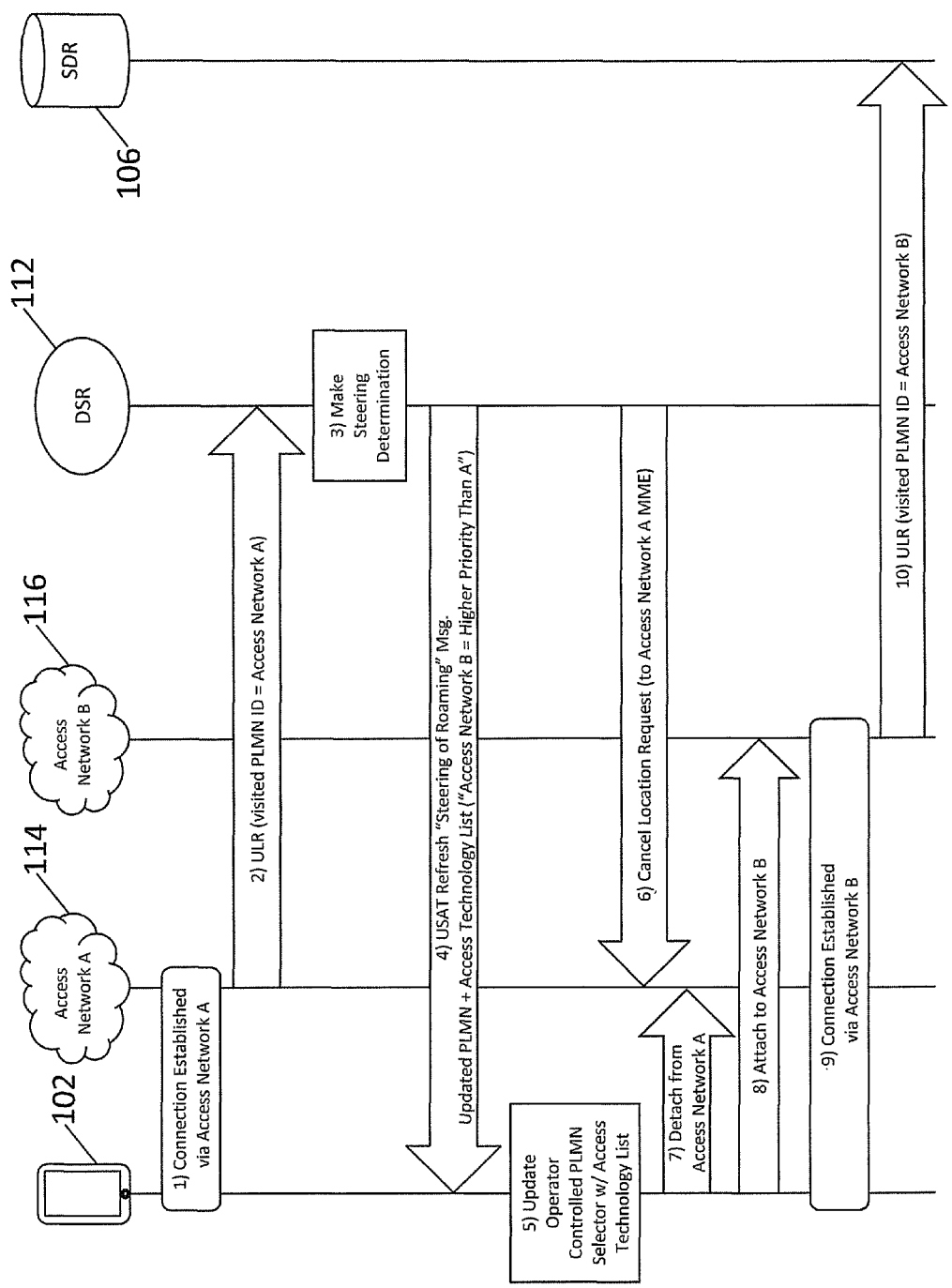
FIG. 6 is an exemplary message sequence for Diameter-based steering of mobile device network access in which the mobile device's universal subscriber identity module (USIM) is updated to reflect preferred roaming network information in response to a ULR in accordance with embodiments of the subject matter described herein.

FIG. 6 is an exemplary message sequence for Diameter-based steering of mobile device network access in which the mobile device's universal subscriber identity module (USIM) is updated to reflect preferred roaming network information in response to a ULR in accordance with embodiments of the subject matter described herein. Referring to FIG. 6, at step 1, mobile device 102 may be connected via access network 114. At step 2, access network 114 may send a ULR message associated with mobile device 102 to SDR node 106. The ULR message may specify that a subscriber utilizing mobile device 102 is connected via access network 114. En route to SDR node 106, DSR node 112 may intercept the ULR message. In accordance with embodiments of the subject matter described herein, at step 3, DSR node 112 may determine that mobile device 102 should be steered to access network 116. For example, a steering rule stored in steering/screening rules database 136 may specify that the subscriber utilizing mobile device 102 should be steered to access network 116. In some embodiments, DSR node 112 may determine that mobile device 102 should be steered to access network 116 by examining username information (e.g., information associated with the subscriber utilizing mobile device 102), visited network identification information (e.g., information associated with access network 114), and/or radio access network type identification information (e.g., information associated with radio access network type 126 and/or radio access network type 128) contained in the ULR message and may identify access network 116 based on the examined username information, visited network identification information, and/or radio access network type identification information. In some embodiments DSR node 112 may log the Diameter-based steering event in a steering log table (not illustrated).

At step 4, DSR node 112 may generate and communicate to mobile device 102 a USIM application toolkit (USAT) message to update mobile device 102's preferred roaming network information (e.g., to modify mobile device 102's preferred roaming network information so that access network 116 is given higher priority than access network 114). At step 5, mobile device 102 may receive the USAT message from DSR node 112 and may update its preferred roaming network information accordingly. At step 6, DSR node 112 may send a CLR message to access network 114's MME node 122. In some embodiments, DSR node 112 may send a message to SDR node 106 instructing SDR node 106 to send the CLR message to access network 114's MME node 122 on its behalf (not illustrated). At step 7, mobile device 102 may detach from access network 114. At step 8, mobile device 102 may send a message to access network 116 to initiate attachment and, at step 9, mobile device 102 may establish a connection via access network 116. At step 10, access network 116 may send a ULR message to SDR node 106 indicating mobile device 102's successful connection via access network 116.

Figure 7:
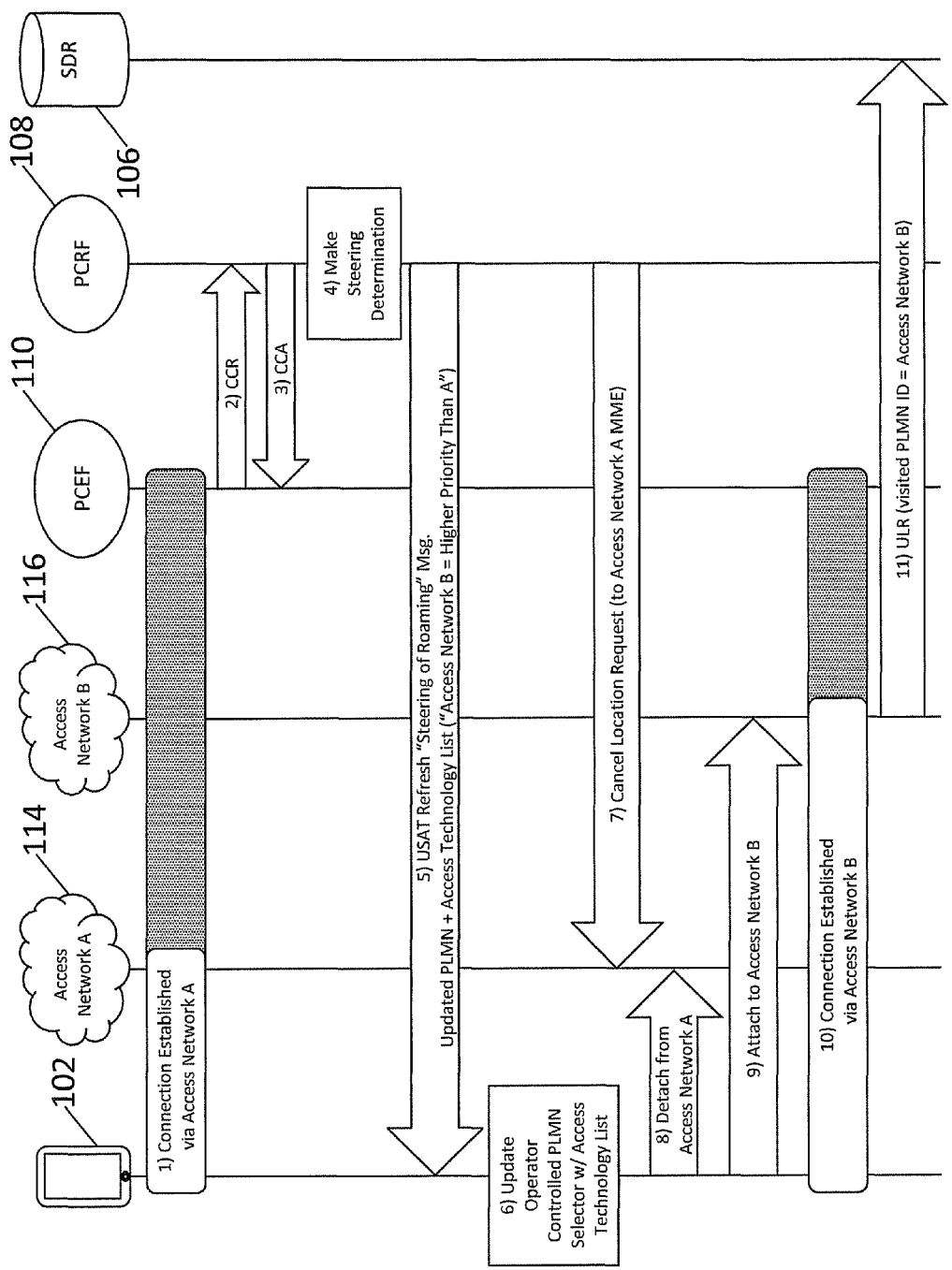
FIG. 7 is an exemplary message sequence for Diameter-based steering of mobile device network access in which the mobile device's USIM is updated to reflect preferred roaming network information in response to a CCR in accordance with embodiments of the subject matter described herein.

FIG. 7 is an exemplary message sequence for Diameter-based steering of mobile device network access in which the mobile device's USIM is updated to reflect preferred roaming network information in response to a CCR in accordance with embodiments of the subject matter described herein. Referring to FIG. 7, at step 1, mobile device 102 may be connected to PCEF node 110 via access network 114. At step 2, PCEF node 110 may send a CCR message associated with mobile device 102 to PCRF node 108. At step 3, PCRF node 108 may respond to the CCR message with a CCA message. In accordance with embodiments of the subject matter described herein, at step 4, PCRF node 108 may determine that mobile device 102 should be steered to access network 116. For example, a steering rule stored in steering/screening rules database 134 may specify that the subscriber utilizing mobile device 102 should be steered to access network 116. In some embodiments, PCRF node 108 may determine that mobile device 102 should be steered to access network 116 by examining username information (e.g., information associated with the subscriber utilizing mobile device 102), visited network identification information (e.g., information associated with access network 114), and/or radio access network type identification information (e.g., information associated with radio access network type 126 and/or radio access network type 128) contained in the CCR message and may identify access network 116 based on the examined username information, visited network identification information, and/or radio access network type identification information. In some embodiments PCRF node 108 may log the Diameter-based steering event in a steering log table (not illustrated).

At step 5, PCRF node 108 may generate and communicate to mobile device 102 a USAT message to update mobile device 102's preferred roaming network information (e.g., to modify mobile device 102's preferred roaming network information so that access network 116 is given higher priority than access network 114). At step 6, mobile device 102 may receive the USAT message from PCRF node 108 and may update its preferred roaming network information accordingly. At step 7, PCRF node 108 may send a CLR message to access network 114's MME node 122. In some embodiments, PCRF node 108 may send a message to SDR node 106 instructing SDR node 106 to send the CLR message to access network 114's MME node 122 on its behalf (not illustrated). At step 8, mobile device 102 may detach from access network 114. At step 9, mobile device 102 may send a message to access network 116 to initiate attachment and, at step 10, mobile device 102 may establish a connection with PCEF node 110 via access network 116. At step 11, access network 116 may send a ULR message to SDR node 106 indicating mobile device 102's successful connection via access network 116.

Figure 8:
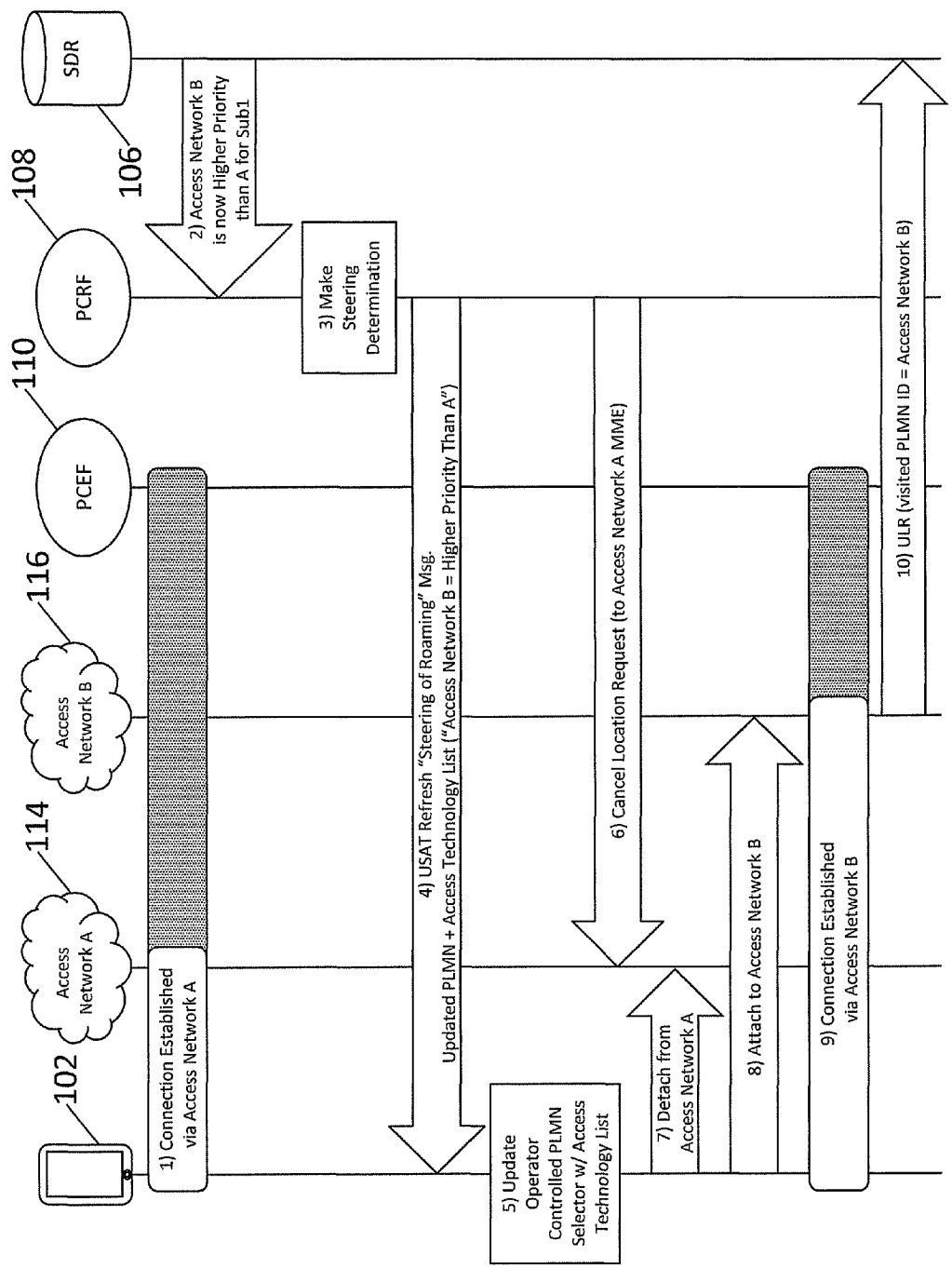
FIG. 8 is an exemplary message sequence for Diameter-based steering of mobile device network access in which the mobile device's USIM is updated to reflect preferred roaming network information by a policy and charging rules function (PCRF) node in response to a change in network priority information in accordance with embodiments of the subject matter described herein.

FIG. 8 is an exemplary message sequence for Diameter-based steering of mobile device network access in which the mobile device's USIM is updated to reflect preferred roaming network information by a PCRF node in response to a change in network priority information in accordance with embodiments of the subject matter described herein. Referring to FIG. 8, at step 1, mobile device 102 may be connected to PCEF node 110 via access network 114. At step 2, SDR node 106 may send a message to PCRF node 108 indicating that access network 116 is now a higher priority network than access network 114 for a subscriber utilizing mobile device 102. For example, an operator associated with carrier network 104 may have provisioned SDR node 106 with an updated steering rule specifying that access network 116 is now a higher priority network than access network 114 for the subscriber utilizing mobile device 102. In accordance with embodiments of the subject matter described herein, at step 3, PCRF node 108 may determine that mobile device 102 should be steered to access network 116. For example, PCRF node 108 may determine that mobile device 102 should be steered to access network 116 in response to SDR node 106's message indicating that access network 116 is now a higher priority network than access network 114 for the subscriber utilizing mobile device 102. In some embodiments PCRF node 108 may log the Diameter-based steering event in a steering log table (not illustrated).

At step 4, PCRF node 108 may generate and communicate to mobile device 102 a USAT message to update mobile device 102's preferred roaming network information (e.g., to modify mobile device 102's preferred roaming network information so that access network 116 is given higher priority than access network 114). At step 5, mobile device 102 may receive the USAT message from PCRF node 108 and may update its preferred roaming network information accordingly. At step 6, PCRF node 108 may send a CLR message to access network 114's MME node 122. In some embodiments, PCRF node 108 may send a message to SDR node 106 instructing SDR node 106 to send the CLR message to access network 114's MME node 122 on its behalf (not illustrated). At step 7, mobile device 102 may detach from access network 114. At step 8, mobile device 102 may send a message to access network 116 to initiate attachment and, at step 9, mobile device 102 may establish a connection with PCEF node 110 via access network 116. At step 10, access network 116 may send a ULR message to SDR node 106 indicating mobile device 102's successful connection via access network 116.

Figure 9:
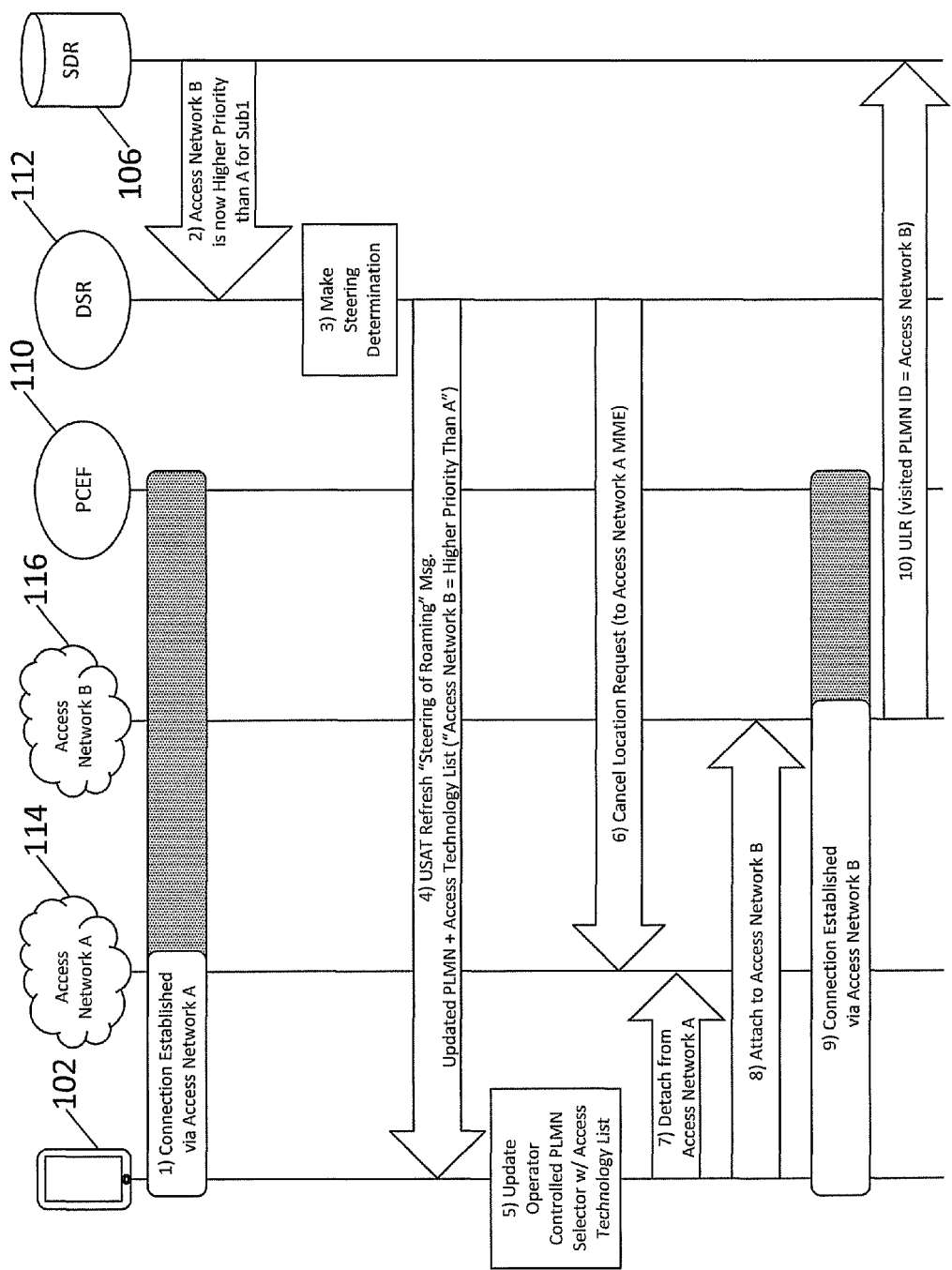
FIG. 9 is an exemplary message sequence for Diameter-based steering of mobile device network access in which the mobile device's USIM is updated to reflect preferred roaming network information by a Diameter signaling router (DSR) node in response to a change in network priority information in accordance with embodiments of the subject matter described herein.

FIG. 9 is an exemplary message sequence for Diameter-based steering of mobile device network access in which the mobile device's USIM is updated to reflect preferred roaming network information by a DSR node in response to a change in network priority information in accordance with embodiments of the subject matter described herein. Referring to FIG. 9, at step 1, mobile device 102 may be connected to PCEF node 110 via access network 114. At step 2, SDR node 106 may send a message to DSR node 112 indicating that access network 116 is now a higher priority network than access network 114 for a subscriber utilizing mobile device 102. For example, an operator associated with carrier network 104 may have provisioned SDR node 106 with an updated steering rule specifying that access network 116 is now a higher priority network than access network 114 for the subscriber utilizing mobile device 102. In accordance with embodiments of the subject matter described herein, at step 3, DSR node 112 may determine that mobile device 102 should be steered to access network 116. For example, DSR node 112 may determine that mobile device 102 should be steered to access network 116 in response to SDR node 106's message indicating that access network 116 is now a higher priority network than access network 114 for the subscriber utilizing mobile device 102. In some embodiments DSR node 112 may log the Diameter-based steering event in a steering log table (not illustrated).

At step 4, DSR node 112 may generate and communicate to mobile device 102 a USAT message to update mobile device 102's preferred roaming network information (e.g., to modify mobile device 102's preferred roaming network information so that access network 116 is given higher priority than access network 114). At step 5, mobile device 102 may receive the USAT message from DSR node 112 and may update its preferred roaming network information accordingly. At step 6, DSR node 112 may send a CLR message to access network 114's MME node 122. In some embodiments, DSR node 112 may send a message to SDR node 106 instructing SDR node 106 to send the CLR message to access network 114's MME node 122 on its behalf (not illustrated). At step 7, mobile device 102 may detach from access network 114. At step 8, mobile device 102 may send a message to access network 116 to initiate attachment and, at step 9, mobile device 102 may establish a connection with PCEF node 110 via access network 116. At step 10, access network 116 may send a ULR message to SDR node 106 indicating mobile device 102's successful connection via access network 116.

FIG. 10 is an exemplary steering policy rule data table for Diameter-based steering of mobile device network access in accordance with embodiments of the subject matter described herein. Referring to FIG. 10, table 1000 may specify one or more steering policy rules. For example, table 1000 may include a column for specifying subscriber identification information (e.g., an international mobile subscriber identity (IMSI), a globally unique temporary identity (GUTI), and/or a uniform resource identifier (URI)). Table 1000 may also include one or more columns for specifying one or more steering conditions. For example, table 1000 may include a column for specifying a radio access network steering condition, a radio access network type steering condition, a day of week steering condition, a time of day steering condition, and/or a tracking area, location area, and/or cell identifier steering condition. Table 1000 may further include a column for specifying whether a subscriber matching specified steering conditions should be allowed or denied, and a column specifying an access technology list profile that should be communicated to the USIM of the mobile device being utilized by the subscriber.

Table 1000 may also include one or more entries specifying individual steering policy rules. For example, table 1000 may include an entry specifying that any subscriber identifier utilizing the "VisitedNetX" radio access network, any radio access network type, on any day of the week, at any time of the day, from any tracking area, location area, or cell identifier, should be denied using "ErrorCode_1", and no access technology list profile should be communicated to the USIM of the mobile device being utilized by such subscriber. Table 1000 may also include an entry specifying that subscriber identifier "SubID1", utilizing any radio access network, via radio access network type "RAT-typeY", on any day of the week, at any time of the day, from any tracking area, location area, or cell identifier, should be denied using "ErrorCode_2", and access technology list profile "List1" should be communicated to the USIM of the mobile device being utilized by such subscriber. In some embodiments, table 1000 may be stored in one or more steering/screening rules databases, for example, steering/screening rules database 134 and/or steering/screening rules database 136.

FIG. 11 is an exemplary steering log data table for Diameter-based steering of mobile device network access in accordance with embodiments of the subject matter described herein. Referring to FIG. 11, table 1100 may be utilized to log the occurrence of Diameter-based steering events. For example, table 1100 may include a column for specifying subscriber identification information (e.g., an IMSI, a GUTI, and/or a URI) for a Diameter-based steering event. Table 1100 may also include a column for specifying an access technology list profile that was communicated to the USIM of the mobile device being utilized by the subscriber, and a column for specifying the time at which the profile was communicated. Table 1100 may also include one or more entries specifying individual Diameter-based steering events. For example, table 1100 may include an entry specifying that a Diameter-based steering event occurred for subscriber identifier "SubID1", in which access technology list profile "List1" was communicated to the USIM of the mobile device being utilized by the subscriber, on Jan. 1, 2010 at 02:30:34. In some embodiments, table 1100 may be stored in one or more steering/screening rules databases, for example, steering/screening rules database 134 and/or steering/screening rules database 136.

Figure 12:
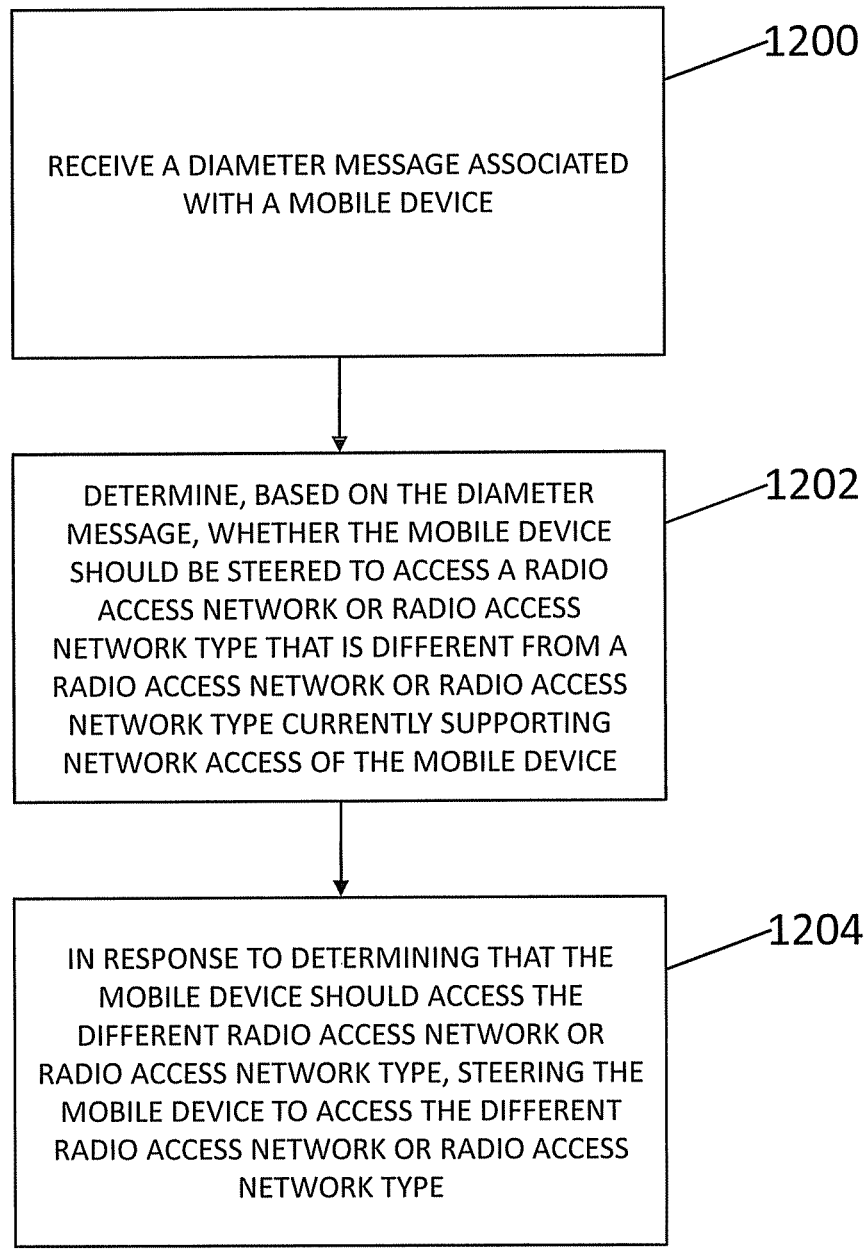
FIG. 12 is a flow chart illustrating an exemplary process for Diameter-based steering of mobile device network access in accordance with embodiments of the subject matter described herein.

FIG. 12 is a flow chart illustrating an exemplary process for Diameter-based steering of mobile device network access in accordance with embodiments of the subject matter described herein. Referring to FIG. 12, in step 1200, a Diameter message associated with a mobile device is received. For example, DSR node 112 may receive a ULR message associated with mobile device 102. In step 1202, it is determined, based on the Diameter message, whether the mobile device should be steered to access a radio access network or radio access network type that is different from a radio access network or radio access network type currently supporting network access of the mobile device. For example, DSR node 112 may determine, based on the ULR message, that mobile device 102 should be steered to access access network 116. In step 1204, in response to determining that the mobile device should access the different radio access network or radio access network type, the mobile device is steered to access the different radio access network or radio access network type. For example, in response to determining that mobile device 102 should access access network 116, mobile device 102 may be steered to access access network 116.

Figure 13:
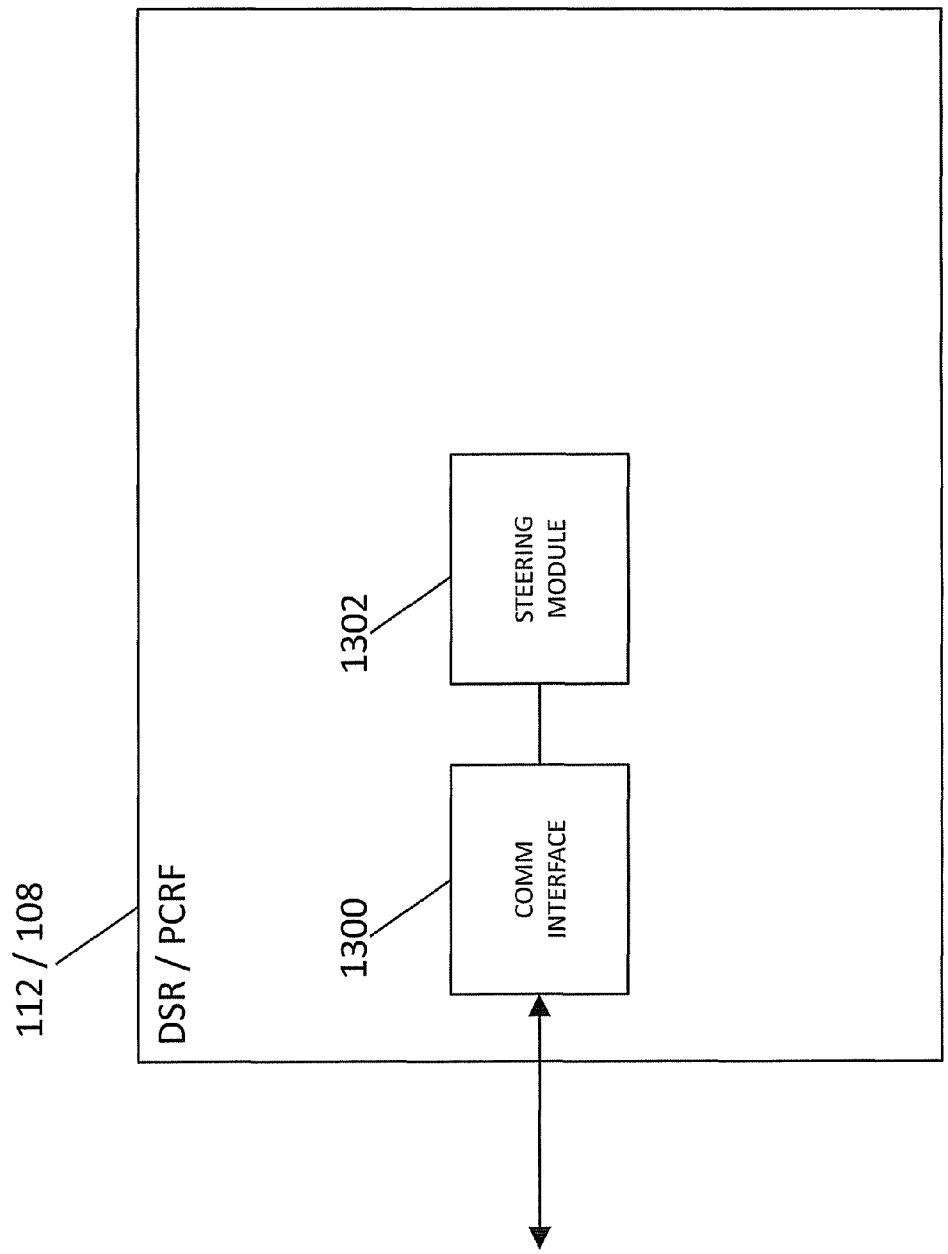
FIG. 13 is a block diagram illustrating a network node for Diameter-based steering of mobile device network access in accordance with embodiments of the subject matter described herein.

FIG. 13 is a block diagram illustrating a network node for Diameter-based steering of mobile device network access in accordance with embodiments of the subject matter described herein. Referring to FIG. 13, DSR node 112 and/or PCRF node 108 may include communication interface 1300. Communication interface 1300 may be any interface suitable for sending and/or receiving Diameter messages. Communication interface 1300 may be configured to receive a Diameter message associated with a mobile device. For example, communicate interface 1300 may be configured to receive a ULR message associated with mobile device 102. DSR node 112 and/or PCRF node 108 may also include steering module 1302. Steering module 1302 may be configured to determine, based on the Diameter message, whether the mobile device should be steered to access a radio access network or a radio access network type that is different from a radio access network or radio access network type currently supporting network access of the mobile device. For example, steering module 1302 may be configured to determine, based on the ULR message, that mobile device 102 should be steered to access access network 116. Steering module 1302 may also be configured to, in response to determining that the mobile device should access the different radio access network or radio access network type, steer the mobile device to access the different radio access network or radio access network type. For example, steering module 1302 may be configured to, in response to determining that mobile device 102 should access access network 116, steer mobile device 102 to access access network 116.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for Diameter-based steering of mobile device network access, the method comprising:

receiving a Diameter signaling message associated with a mobile device;

determining, based on the Diameter signaling message, whether the mobile device should be steered to access a radio access network or a radio access network type that is different from a radio access network or radio access network type currently supporting network access of the mobile device; and in response to determining that the mobile device should access the different radio access network or radio access network type, steering the mobile device to access the different radio access network or radio access network type, wherein the Diameter signaling message comprises a Diameter update location request (ULR) message or a Diameter credit control request (CCR) message, wherein, if the Diameter signaling message comprises a Diameter ULR message, steering the mobile device includes responding to an originator of the Diameter ULR message with a related Diameter update location answer (ULA) message that includes information instructing the mobile device to connect using the different radio access network or radio access network type.

2. The method of claim 1 wherein, if the Diameter signaling message comprises a Diameter CCR message, steering the mobile device includes generating a Diameter cancel location request (CLR) message that triggers the mobile device to connect to the different radio access network or the different radio access network type.

3. The method of claim 1 wherein the Diameter signaling message comprises at least one of username information, visited network identification information, and radio access type identification information.

4. The method of claim 3 wherein determining whether the mobile device should be steered includes examining the at least one of the username information, the visited network identification information, and the radio access type identification information, and identifying the different radio access network or radio access network type based on the username information, the visited network identification information, or the radio access type identification information.

5. The method of claim 3 wherein the Diameter signaling message comprises username information and wherein determining whether the mobile device should be steered includes using the username information to obtain at least one of visited network identification information and visited network radio access type identification information, examining the visited network identification information or the visited network radio access type identification information, and identifying the different radio access network or radio access network type based on the visited network identification information or the visited network radio access type identification information.

6. The method of claim 3 wherein determining whether the mobile device should be steered includes examining the at least one of the username information, the visited network identification information, and the radio access type identification information, identifying the different radio access network or radio access network type based on the username information, the visited network identification information, or the radio access type identification information, and generating a universal subscriber identity module (USIM) application toolkit (USAT) message to update preferred roaming network information on the mobile device.

7. The method of claim 6 further comprising generating a Diameter cancel location request (CLR) message that causes the mobile device to disconnect from the current radio access network or current radio access network type and reconnect via the different radio access network or radio access network type.

8. The method of claim 1 comprising performing the steering at a Diameter signaling router (DSR) node or a policy and charging rules function (PCRF) node.

9. A system for Diameter-based steering of mobile device network access, the system comprising:

a network node comprising:

a communication interface configured to receive a Diameter signaling message associated with a mobile device; and a steering module configured to determine, based on the Diameter signaling message, whether the mobile device should be steered to access a radio access network or a radio access network type that is different from a radio access network or radio access network type currently supporting network access of the mobile device, and, in response to determining that the mobile device should access the different radio access network or radio access network type, steer the mobile device to access the different radio access network or radio access network type, wherein the Diameter signaling message comprises a Diameter update location request (ULR) message or a Diameter credit control request (CCR) message, wherein, if the Diameter signaling message comprises a Diameter ULR message, steering the mobile device includes responding to an originator of the Diameter ULR message with a related Diameter update location answer (ULA) message that includes information instructing the mobile device to connect using the different radio access network or radio access network type.

10. The system of claim 9 wherein, if the Diameter signaling message comprises a Diameter CCR message, the steering module is configured to steer the mobile device by generating a Diameter cancel location request (CLR) message that triggers the mobile device to connect using the different radio access network or radio access network type.

11. The system of claim 9 wherein the Diameter signaling message comprises at least one of username information, visited network identification information, and radio access type identification information.

12. The system of claim 11 wherein the steering module is configured to determine whether the mobile device should be steered by examining the at least one of the username information, the visited network identification information, and the radio access type identification information, and to identify the different radio access network or radio access network type based on the username information, the visited network identification information, or the radio access type identification information.

13. The system of claim 11 wherein the Diameter signaling message comprises username information and wherein the steering module is configured to determine whether the mobile device should be steered by using the username information to obtain at least one of visited network identification information and visited network radio access type identification information, to examine the visited network identification information or the visited network radio access type identification information, and to identify the different radio access network or radio access network type based on the visited network identification information or the visited network radio access type identification information.

14. The system of claim 11 wherein the steering module is configured to determine whether the mobile device should be steered by examining the at least one of the username information, the visited network identification information, and the radio access type identification information, to identify the different radio access network or radio access network type based on the username information, the visited network identification information, or the radio access type identification information, and to generate a universal subscriber identity module (USIM) application toolkit (USAT) message to update preferred roaming network information on the mobile device.

15. The system of claim 14 wherein the steering module is configured to generate a Diameter cancel location request (CLR) message that causes the mobile device to disconnect from the current radio access network or radio access network type and reconnect via the different radio access network or radio access network type.

16. The system of claim 9 wherein the network node comprises at least one of a Diameter signaling router (DSR) and a policy and charging rules function (PCRF).

17. A non-transitory computer readable medium comprising computer executable instructions that when executed by a processor of a computer control the computer to perform steps comprising:

receiving a Diameter signaling message associated with a mobile device;

determining, based on the Diameter signaling message, whether the mobile device should be steered to access a radio access network or a radio access network type that is different from a radio access network or radio access network type currently supporting network access of the mobile device; and in response to determining that the mobile device should access the different radio access network or radio access network type, steering the mobile device to access the different radio access network or radio access network type, wherein the Diameter signaling message comprises a Diameter update location request (ULR) message or a Diameter credit control request (CCR) message, wherein, if the Diameter signaling message comprises a Diameter ULR message, steering the mobile device includes responding to an originator of the Diameter ULR message with a related Diameter update location answer (ULA) message that includes information instructing the mobile device to connect using the different radio access network or radio access network type.

* * * * *